United States Patent [19]

Longenecker et al.

[11] Patent Number: 4,828,240

[45] Date of Patent: * May 9, 1989

[54] WORKPIECE SECURING APPARATUS FOR A MACHINE TOOL

[75] Inventors: Francis S. Longenecker; Kevin J. Moeder, both of Englewood; Jeffrey L. Wolff, Dayton, all of Ohio

[73] Assignee: TE-CO., Englewood, Ohio

[*] Notice: The portion of the term of this patent subsequent to Dec. 8, 2004 has been disclaimed.

[21] Appl. No.: 129,052

[22] Filed: Dec. 7, 1987

Related U.S. Application Data

[63] Continuation-in-part of Ser. No. 902,574, Sep. 2, 1986, Pat. No. 4,711,437.

[51] Int. Cl.⁴ .............................................. B23Q 3/06
[52] U.S. Cl. ......................................... 269/47; 269/91; 269/100; 269/137; 269/228; 269/303; 269/900
[58] Field of Search ................... 269/228, 137, 91, 93, 269/99–100, 900, 303, 305, 315, 309, 310, 97, 50–52; 409/219; 408/90

[56] References Cited

U.S. PATENT DOCUMENTS

| | | | |
|---|---|---|---|
| 3,598,392 | 8/1971 | Williamson et al. | 269/47 |
| 4,073,215 | 2/1978 | Coope et al. | |
| 4,286,778 | 9/1981 | Follmeyer | 269/91 |
| 4,310,963 | 1/1982 | Blumle | |
| 4,335,873 | 6/1982 | Kiefer | 269/228 |
| 4,429,862 | 2/1984 | Niedecker | 269/91 |
| 4,489,927 | 12/1984 | Yamada et al. | 269/137 |
| 4,549,727 | 10/1985 | Kozar | 269/93 |
| 4,585,217 | 9/1986 | Erickson | 269/900 |
| 4,630,811 | 12/1986 | Rudisill | 269/900 |

FOREIGN PATENT DOCUMENTS 2408350  8/1975  Fed. Rep. of Germany ...... 269/900

Primary Examiner—Robert C. Watson
Attorney, Agent, or Firm—Jacox & Meckstroth

[57] ABSTRACT

A workpiece is clamped to the table of a machine tool by a toggle clamp or edge clamp supported for rotation by the head portion of a stud threaded into a hole within a member secured to the table. The member may comprise a column or a column extender each having a frame with precisionly attached plates having X-Y grid patterns of alternating threaded holes and precision bores. A grid or base plate with an X-Y pattern of holes and bores may also receive an angle plate which also has an X-Y grid pattern of threaded holes and precision bores in addition to counterbores and precision angle positioning bores which receive pins for precisely locating the angle plate at a selected predetermined angle relative to the grid or base plate. The workpiece may also be secured to T-slot plates which are retained in precision locations on a base plate to define precision T-slots for receiving T-nuts. An adjustable radius locator system provides for precisely locating on the base plate a workpiece having two precision holes.

16 Claims, 3 Drawing Sheets

U.S. Patent   May 9, 1989   Sheet 1 of 3   4,828,240
FIG-1
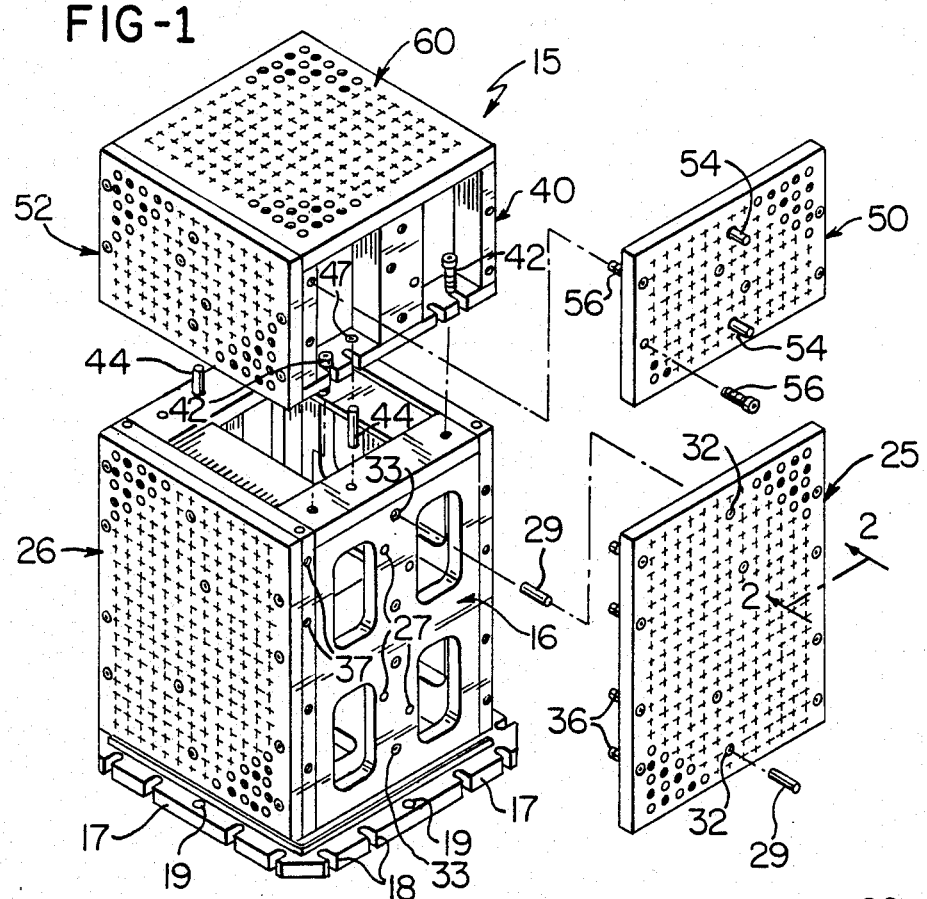
FIG-3
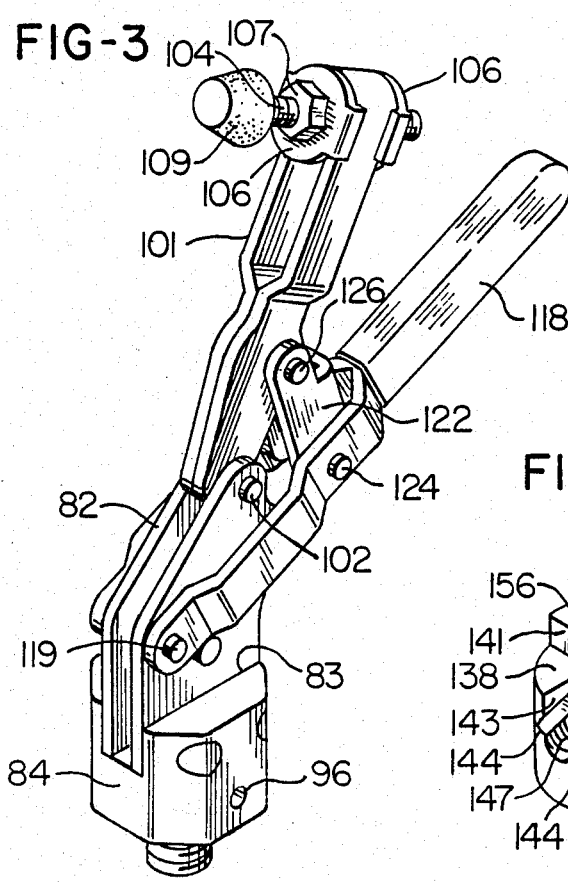
FIG-2
FIG-4
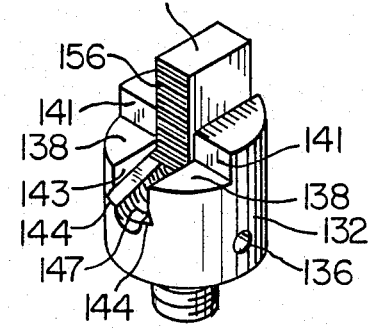
FIG-5
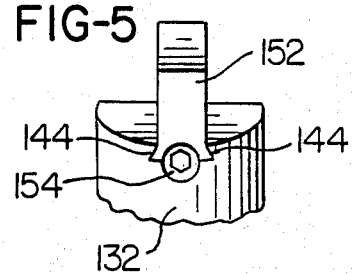

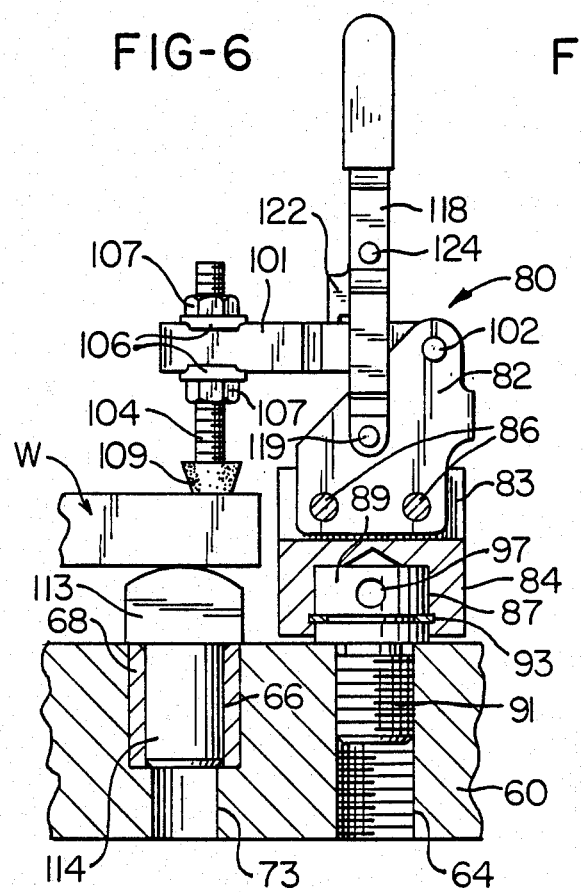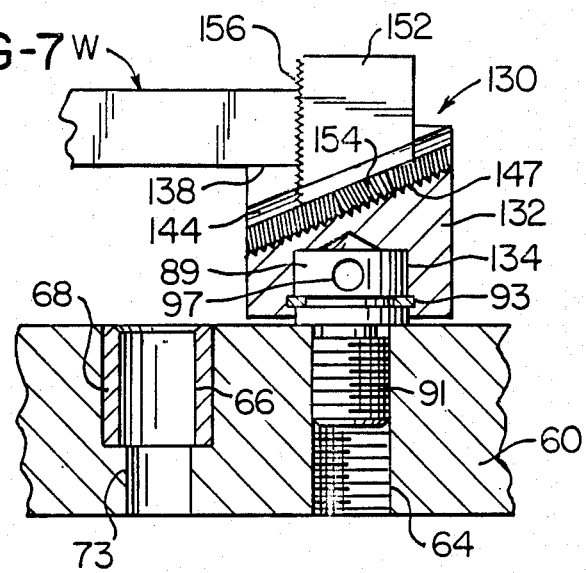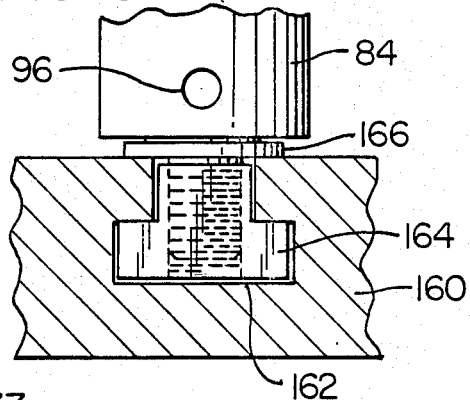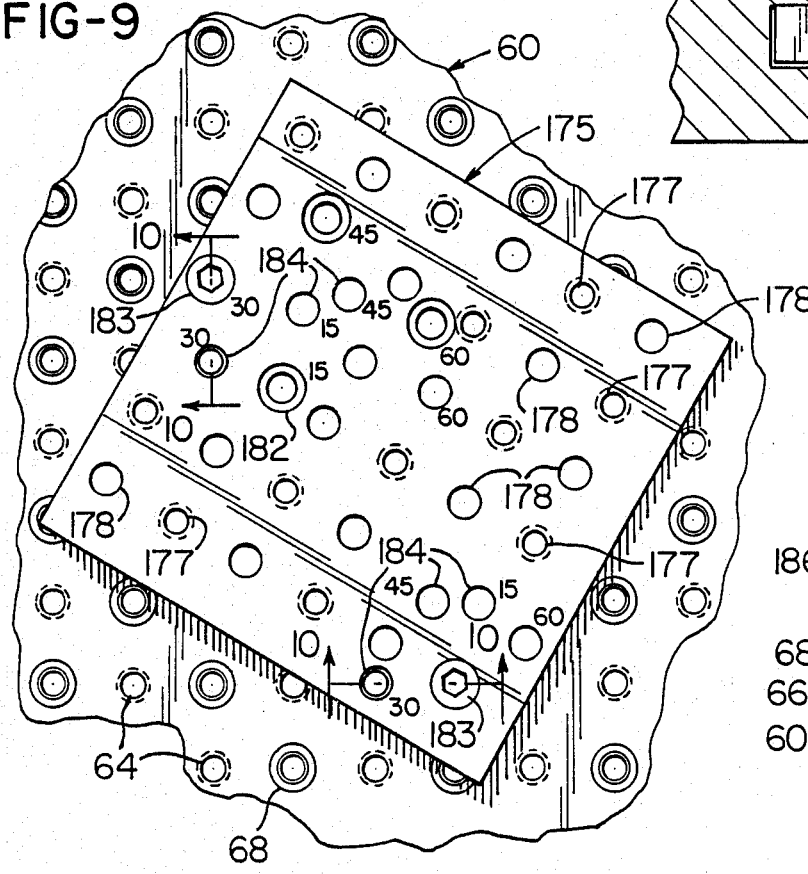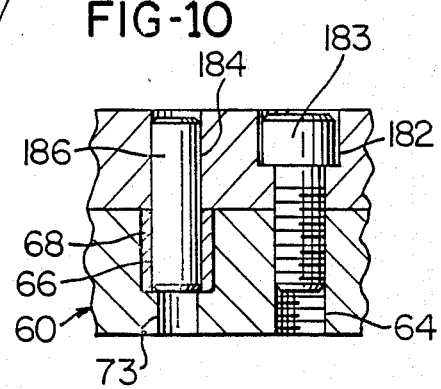

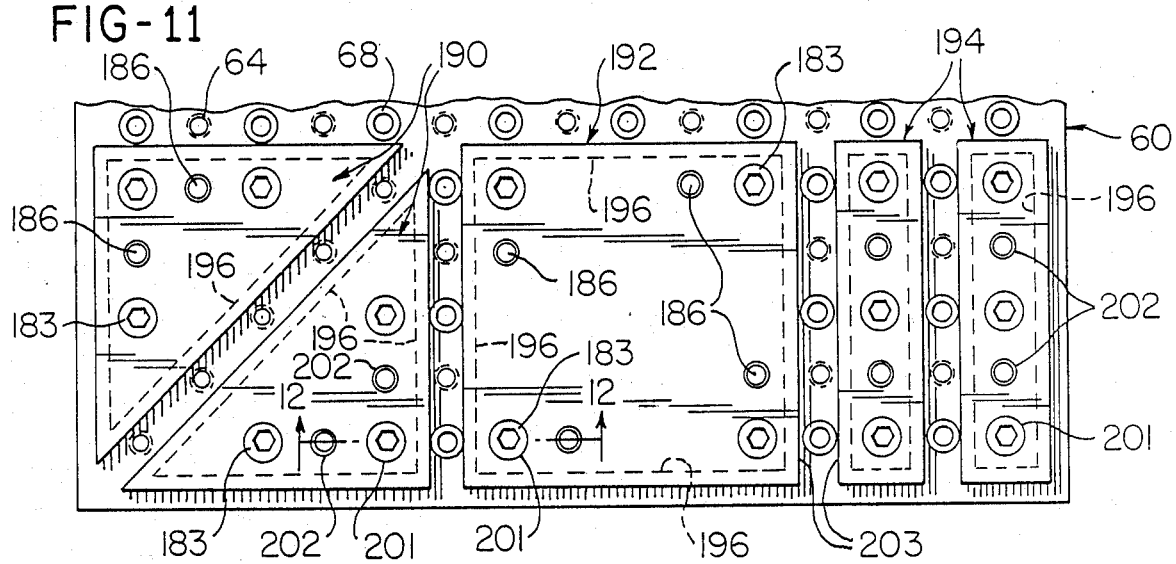
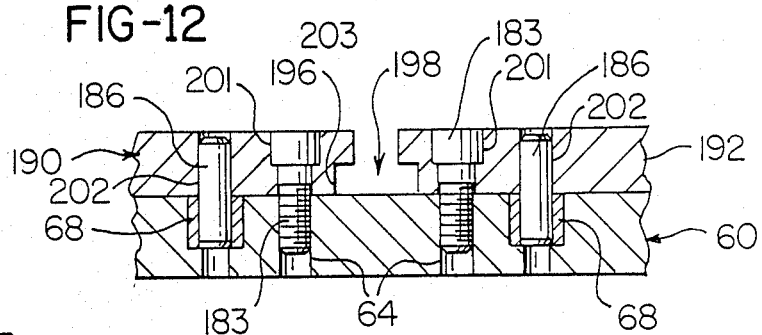
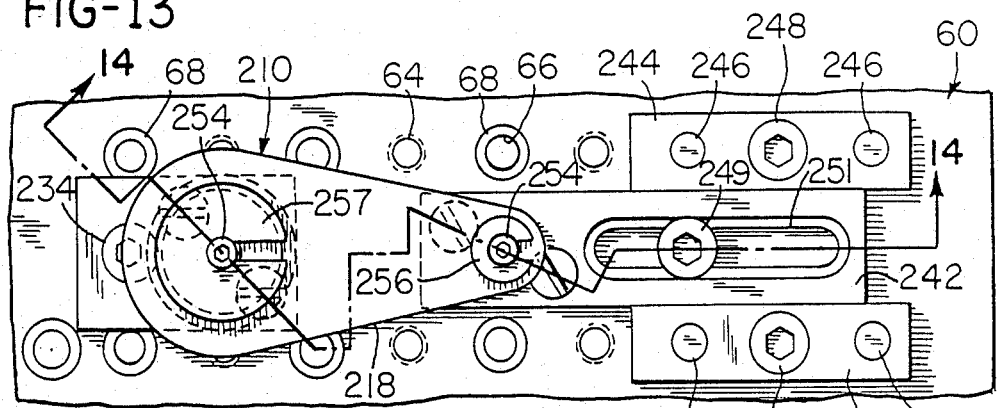
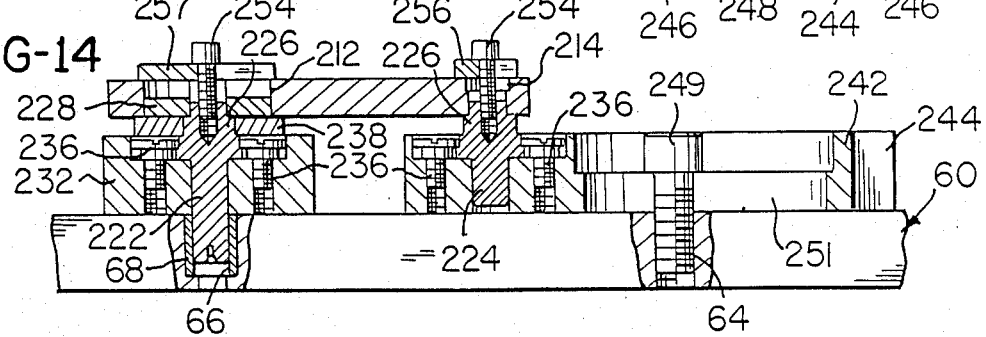

WORKPIECE SECURING APPARATUS FOR A MACHINE TOOL

RELATED APPLICATION

This application is a continuation-in-part of application Ser. No. 902,574 filed Sept. 2, 1986, now U.S. Pat. No. 4,711,437.

BACKGROUND OF THE INVENTION

In the art of modular fixturing or tooling systems, it is known to use various grid plates or components which have flat surfaces each provided with a precision X-Y grid pattern of threaded holes and precision bores for conveniently attaching and precisely locating a workpiece to the table of a machine tool. For example, U.S. Pat. Nos. 4,073,215 and 4,310,963 each discloses a system including a base plate or sub-plate having an X-Y grid pattern of threaded holes and precision bores, and the systems are used for securing workpieces to the table of a machine tool. The use of such a modular fixturing or tooling system has been found highly desirable for reducing the set-up time required to secure a workpiece to a machine tool table at predetermined positions depending upon the type of machining required on the workpiece.

SUMMARY OF THE INVENTION

The present invention is directed to improved apparatus for securing workpieces to a machine tool table and which are particularly useful with a modular tooling system having grid plates with a precision X-Y grid pattern of threaded holes and precision bores such as disclosed in the above patents. The apparatus of the invention significantly reduces the time required for precisely aligning or locating a workpiece on a machine tool table and for repositioning the workpiece to machine various surfaces on the workpiece.

In accordance with one apparatus of the invention, a column frame has a bottom flange adapted to be secured to a machine tool table, and precision grid plates are secured to the sides of the frame in precision locations. A column extender frame is secured to the top of the column frame in precision registration, and precision grid plates are secured to the sides and/or top of the column extender frame so that the grid plates on the extender frame are in precise registration with the corresponding grid plates on the underneath column frame and form continuations of the grid plates on the column frame.

The threaded holes in a grid plate are each adapted to receive a workpiece clamping device which has a body rotatably mounted on a cylindrical head portion of a stud threaded into one of the threaded holes in the grid plate. The body is provided with means for threading and tightening the stud into the threaded hole after the body is assembled for rotation on the head portion of the stud. The workpiece clamp may comprise an overcenter toggle clamp or an edge gripping clamp having a nose member movable along an inclined track in response to rotation of a set screw.

In another embodiment, one of the base or sub grid plates supports an angle plate which also has a precision X-Y grid pattern of threaded holes and precision bores with the same spacing between the bores and holes as the bores and holes on the grid plate. In addition, the angle plate includes multiple pairs of precision bores corresponding to different predetermined angles of the angle plate relative to the supporting grid plate with each pair of precision bores in the angle plate being aligned with a pair of precision bores in the base plate for each predetermined angle. The angle plate also includes a counterbored pivot hole and another counter-bored hole for each predetermined angle for receiving screws which secure the angle grid plate to the base grid plate at each predetermined angle.

A workpiece may also be secured to a base or sub grid plate by T-slot plates which have precision outer edge surfaces and precision bores located for alignment with the precision bores within the grid plate. The T-slot plates cooperate to define precision T-slots which may be located according to the shape, size and position of the workpiece to be machined. A workpiece having two precision holes is precisely located by a system including an adjustable radius locator.

Other features and advantages of the invention will be apparent from the following description, the accompanying drawing and the appending claims.

BRIEF DESCRIPTION OF THE DRAWINGS

FIG. 1 is an exploded perspective view of a modular fixturing column assembly constructed in accordance with the invention and having a set of corresponding grid or sub-plates;

FIG. 2 is an enlarged fragmentary section taken generaly on the line 2—2 of FIG. 1;

FIG. 3 is a perspective view of a toggle clamp unit constructed in accordance with the invention and adaped to be mounted on a grid plate;

FIG. 4 is a perspective view of an edge clamp unit constructed in accordance with the invention and adapted to be mounted on a grid plate;

FIG. 5 is a fragmentary view of the edge clamp unit shown in FIG. 4;

FIG. 6 is an elevational view of the toggle clamp unit shown in FIG. 3 and with portions broken away to illustrate its connection to a grid plate;

FIG. 7 is an elevational view of the edge clamp unit shown in FIG. 4 and with portions broken away to show its connection to a grid plate;

FIG. 8 is a fragmentary view in part section of a clamp unit secured directly to a machine tool table;

FIG. 9 is a plan view of an angle plate constructed in accordance with the invention and illustrating its mounting on a grid plate;

FIG. 10 is a fragmentary section taken generally on each of the lines 10—10 of FIG. 9.

FIG. 11 is a fragmentary plan view of T-slot plates constructed and mounted on a grid plate in accordance with the invention;

FIG. 12 is a fragmentary section taken generally on the line 12—12 of FIG. 11.

FIG. 13 is a fragmentary plan view of an adjustable radius locator system; and

FIG. 14 is a section taken generally on the line 14—14 of FIG. 13.

DESCRIPTION OF THE PREFERRED EMBODIMENTS

FIG. 1 illustrates a column assembly 15 which includes a box-shaped hollow frame 16 fabricated of metal plates and having a bottom flange 17 with peripherally spaced slots 18 and precision holes 19 for securing the frame 16 to the table or movable pallet of a machine tool. The slots 18 are adapted to receive screws (not shown) which are threaded into T-nuts (not shown) located within T-slots formed within the machine tool table. Preferably, the column frame 16 has a square horizontal configuration with each side having a width within a range between 13.25 inches and 23.25 inches. The column frame 16 may also be constructed with different heights, for example, within a range between 15.5 inches and 28 inches.

Precision base or sub-plates 25 and 26 are secured to the side walls of the column frame 16 by a set of cap screws (not shown) which extend through counterbored holes within the sub-plates and into threaded holes 27 formed within the side walls of the frame 16. Each plate 25 and 26 is precisely located with respect to the frame 16 by a pair of dowel or locating pins 29 which extend through corresponding precision bushings 32 and 33 precisely inserted into the plates and frame, respectively. Another set of cap screws 36 extend through the vertical edge portions of the sub-plates 25 into aligned threaded holes 37 within the edge portions of the other set of opposing sub-plates 26.

As also shown in FIG. 1, the column frame 16 receives a column extension frame 40 which mounts on top of the column frame 16 and has the same horizontal cross-sectional configuration. The extension frame 40 is secured to the frame 16 by a set of peripherally spaced screws 42 and is precisely located with respect to the frame 16 by a pair of dowel or locating pins 44 which extend into aligned bushings 47 inserted into the top wall of the column frame 16 and the bottom wall of the column extension frame 40. The vertical side walls of the extension frame 40 receive corresponding vertical base or sub-plates 50 and 52 each of which is precisely located on the extension frame 40 by a pair of dowel or locating pins 54 and is secured by a set of cap screws 56.

A square base of sub-plate 60 is secured to the top wall of the extension frame 40 by a set of cap screws (not shown) and is precisely located by a pair of locating pins (not shown) extending into aligned bushings or bores, in the same manner as the plates 50 and 52 are located and secured. The base plate 60 is also adapted to be mounted and precisely located on the top wall of the column frame 16 by means of the locating pins 44 and cap screws 42. As a result of the precision location of the column extension frame 40 on the column frame 16 and the precision location of each of the base of sub-plates 25, 26, 50, 52 and 60, all of the plates and the precision bores within the plates remain in precise registration with each other.

As shown in FIG. 2, each of the base or sub-plates 25, 26, 50, 52 and 60 is provided with a precision X-Y grid pattern of alternating threaded holes 64 and precision locating bores 66. Each of the precision bores 66 is defined by a corresponding precision hardened bushing 68 confined within the base or sub-plate by a surrounding layer of hardenable or epoxy material 72 in a manner as generally disclosed in above-mentioned U.S. Pat. No. 4,310,963. A hole 73 extends from the bottom of each precision bore 66 through the base of sub-plate and is slightly smaller in diameter, as shown in FIG. 2.

Preferably, the centerlines of the bushings 68 are located within the grid pattern at distances of 2.5000 inches between adjacent bushings, and the spacing between adjacent threaded holes 64 is the same so that the centerline spacing between adjacent bushings 68 and threaded holes 64 is 1.2500 inches. After all of the sub-plates are mounted on the frames 16 and 40, each of the sub-plates 50 and 52 forms an extension of the underlying corresponding sub-plate 25 and 26 with the precision spacing between the bushings 68 continuing from each lower sub-plate to the corresponding upper sub-plate. This precision spacing results from the precision coupling of the column extension frame 40 to the column frame 6 and the precision connection of each sub-plate to its supporting frame.

Referring to FIGS. 3 and 6, a workpiece W is clamped to a base or sub-plate such as the grid or base plate 60 by a toggle clamp unit 80 which includes a U-shaped sheet metal bracket 82 mounted within a slot 83 formed within the top of a cylindrical support body 84. The bracket is secured to the body by a pair of cross pins 86, and the body 84 has a cylindrical hole or bore 87 which receives a mating cylindrical head portion 89 of a threaded support stud 91 which extends into a threaded hole 64 within the base plate 60. The head portion 89 of the stud 91 supports the body 84 for rotation, and a retaining ring 93 locks the head portion 89 within the bore 87 for rotation of the body 84. The body 84 has a transverse hole 96 (FIG. 3) which aligns with a hole 97 within the head portion 89 of the stud 91 when the body 84 is rotated relative to stud 91 to the aligned position. In this position, a cross pin or key (not shown) is inserted into the aligned holes 96 and 97, and the toggle clamp unit 80 is rotated to tighten the stud 91 into the hole 64.

In a conventional manner, the bracket 82 of the toggle clamp unit 80 pivotally supports a bar or arm 101 by a pivot pin or rivot 102. The arm 101 carries a threaded bolt or spindle 104 which is secured by a pair of clamping plates 106 and adjustable nuts 107. The lower end portion of the spindle 104 carries a resilient pad 109 which is adapted to press downwardly on a workpiece W while it is resting on a head portion 113 of a support pin 114 extending into a bushing 68.

The bracket 82 also pivotally supports a handle 118 by a pivot pin or rivot 119, and the handle is connected to the arm 101 by a formed U-shaped sheet metal link 122 and a set of pivot pins or rivots 124 and 126. The toggle clamp unit 80 is movable between a retracted or open position (FIG. 3) and a clamped position (FIG. 6) in response to pivoting of the handle 118 between its open position (FIG. 3) and its overcenter locked position (FIG. 6).

A workpiece W may also be clamped to a base or sub-plate such as the base plate 60 by an edge clamp assembly or unit 130 (FIGS. 4, 5 and 7) which includes a cylindrical body 132 having a cylindrical hole or bore 134 for receiving the head portion 89 of a threaded stud 91 in the same manner as described above in connection with the toggle clamp unit 80. The body 132 also has a diametrically extending hole 136 (FIG. 4) which may be aligned with the hole 97 within the head portion 89 for receiving a cross pin or key to provide for threading the stud 91 into a hole 64 by rotation of the clamp body 132. After the stud 91 is tightened, the cross pin or key is removed so that the body 132 may rotate on the head portion 89 where the body is retained by the retaining ring 93.

The edge clamp unit 130 has coplanar surfaces 138 (FIG. 4) which form the seat for the workpiece W, as shown in FIG. 7. The surfaces 138 extend from perpendicular surfaces 141, and a slot 143 interrupts the surfaces 138 and 141. The slot 143 has undercut dovetail-shaped tracks or recesses 144, and the slot 143 and recesses 144 extend on an incline within the body 132. A semi-cylindrical threaded surface 147 forms the bottom of the slot 143.

A jaw or nose member 152 has a bottom portion which mates with the undercut recesses 144 and has a semi-cylindrical bottom surface which cooperates with the threaded surface 147 for receiving and adjusting set screw 154. As shown in FIGS. 5 and 7, when the screw 154 is rotated clockwise with a suitable wrench, the nose member 152 moves downwardly along the inclined undercut surfaces 144 to clamp the workpiece W against the surfaces 138 and a serrated front surface 156 of the nose member 152. As apparent from the above described rotary support incorporated as part of the toggle clamp unit 80 and the edge clamp unit 130, each unit is free to rotate on the threaded support stud 91 so that the unit may be precisely positioned at the desired location relative to the workpiece.

As shown in FIG. 8, it is not necessary for the rotary toggle clamp unit 80 or the rotary edge clamp unit 30 to be mounted on a grid base or sub-plate 60, as shown in FIG. 6 and 7. For example, the rotary body 87 may be connected directly to a machine tool table 160 having parallel spaced T-slots 162 by a T-nut 164 located within the slot 162 and receiving the threaded stud 91. A washer 166 is located between the head portion 89 of the stud 91 to bridge the open top of the slot 162. The stud 91 is tightened into the nut 164 by means of across pin or key extending into the aligned holes 96 and 97 within the body 84 and head portion 89 of the stud 91, as described above in connection with FIGS. 6 and 7.

Referring to FIGS. 9 and 10, the base plate 60 or one of the other grid plates having a precision X-Y grid pattern of threaded holes 64 and precision bores 66 formed by the bushings 68, is adapted to receive an angle plate 175. A square angle plate 175 is illustrated in FIG. 9 and has a precision X-Y grid pattern of threaded holes 177 and precision bores 178 which have precisely the same spacing as the threaded holes 64 and precision bores 66 within the base plate 60 and other grid plates described above. The angle plate 175 is adapted to be selectively positioned at one of a plurality of different angles relative to the base plate 60, for example, at angles of 15°, 30°, 45° and 60°.

As shown in FIG. 10, the angle plate 175 is provided with a counterbored hole 182 for each of the various angles, and another countedbored hole 182 is located within the lower corner portion of the angle plate 175. The holes 182 are adapted to receive socket head cap screws 183. For each of the selected angles, the angle plate 175 is also provided with a pair of precision bores 184 which align with a corresponding pair of bores 66 within the base plate 60 at the selected angle. A pair of locating pins 186 extends into the pair of aligned precision bores 66 and 184 for the selected angle and precisely locate the angle plate 175 with respect to the base plate 60. As also shown in FIG. 9, one set of precision bores 184 is located at a uniform radius with respect to the lowermost bore 182 so that the cap screw 183 within the lowermost bore 182 may serve as a pivot pin for the angle plate 175 before the cap screws are tightened. After the angle plate 175 is located at a selected angle and the precision locating pins 186 are inserted, the cap screws 183 are tightened to secure the angle plate 175 to the base plate 60.

Referring to FIGS. 11 and 12, a precision base or sub-plate such as the base plate 60 with the X-Y grid pattern of threaded holes 64 and precision bores 66, may receive a pair or set of T-slot plates such as the triangular plates 190, square plates 192 and rectangular plates 194. Each of the plates 190, 192 and 194 has a peripherally extending undercut recess 196 (FIG. 12) so that a combination of any two plates properly mounted on the base plate 60 forms an inverted T-slot 198 between the two plates. Each of the T-slot plates 190, 192 and 194 also has a plurality of counterbored holes 201 and a plurality of precision bores 202. The spacing between the threaded holes 201 and precision bores 202 is the same as the spacing between the threaded holes 64 and precision bores 66 within each of the base or sub-plates described above, and the aligned bores 66 and 202 receive locating pins such as the pins 186. The outer peripheral surfaces 203 of each of the T-slot plates 190, 192 and 194 are precisely ground so that not only may T-nuts (not shown) be used within the slots 198, but the outer edge surfaces of the plates may be used for precisely locating a workpiece on the T-slot plates with respect to the base plate 60 or machine tool table.

FIGS. 13 and 14 show the use of the base plate 60 for supporting a workpiece 210 having two precision holes 212 and 214 which are spaced at a distance different from the uniform spacing of the precision bores 66 defined by the bushings 68 within the base plate 60. The workpiece 210 is precisely positioned by the internal holes 212 and 214 in order to machine a surface on the workpiece, for example, the peripheral surface 218 of the workpiece 210. The workpiece 210 is precisely positioned by a set of locating pins 222 and 224 which project into the holes 212 and 214, respectively. Each of the locating pins 222 and 224 has a stepped upper portion 226 formed by three cylindrical surfaces having predetermined different precision diameters. The uppermost cylindrical surface of the pin 224 precisely locates the hole 214 of the workpiece 210, and a precision cylindrical spacer 228 locates the hole 212 on the upper cylindrical surface of the pin 222.

The locating pin 222 extends into one of the bushings 66 within the base plate 60 for precise location relative to the base plate 60, and the pin 222 is supported by a block 232 secured to the base plate 60 by a screw 234 extending into one of the threaded holes 64 within the base plate. A pair of screws 236 secure a flange on the pin 222 to the block 232, and a cylindrical spacer washer 238 supports the workpiece 210 above the block 232.

The locating pin 224 is supported by one end portion of a slide block 242 and is also retained within the block by a pair of lock screws 236. The slide block 242 is confined between a pair of guide blocks 244 each of which is precisely ground and precisely located by a pair of dowel pins 246 projecting into corresponding bushings 68 within the base plate 60. Each of the guide blocks 244 is secured to the base plate 60 by a cap screw 248. Another cap screw 249 extends through a shouldered slot 251 within the slide block 242 for locking the slide block to the base plate 60 after the slide block is adjusted between the guide blocks 244 to position the pin 224 within the hole 214. Thus the support system shown in FIGS. 13 and 14 is adapted to locate and support any form of workpiece having two precision holes spaced at a distance different from the spacing between the holes or bores 66 within the base plate 60. A pair of screws 254 and corresponding C-washers 256 and 257 provide for securing the workpiece 210 to the locating pins 222 and 224.

From the drawings and the above description, it is apparent that the present invention provides apparatus for quickly and precisely securing a workpiece to the table of a machine tool and further provides for accommodating workpieces of many different sizes and shapes. The modular fixture components or apparatus of the invention further provide for using a precision X-Y grid pattern of threaded holes and precision bores within a base or sub-plate so that the components may be used with a modular fixturing system in order to minimize the time required to set up, locate and secure a workpiece to the machine tool table for precision machining.

The precisionly attached base of sub-plates to the column frame and to the extension frame shown in FIG. 1 provide for conveniently selecting columns of various heights and with a precision X-Y grid pattern of threaded holes and precision bores on each face or surface of the column. In addition, the rotary clamping units 80 and 130 provide for accommodating workpieces of various configurations and for quickly securing each workpiece to a precision base plate or grid plate, and the angle plate 175 provides for quickly and precisely positioning a workpiece at a selected angle relative to the base or grid plate. Furthermore, the T-slot plates shown in FIG. 11 provide for forming on a base or support plate T-slots with precision edge surfaces to provide for quickly locating a workpiece in addition to the infinite adjustability of clamps secured to nuts within the T-slots 198. The locator system shown in FIGS. 13 and 14 provides for precisely locating on the base plate 60 a workpiece having two precision holes regardless of the spacing between the holes.

While the forms of fixturing apparatus herein described constitute preferred embodiments of the invention, it is to be understood that the invention is not limited to these precise forms of apparatus, and that changes may be made therein without departing from the scope and spirit of the invention as defined in the appended claims.

The invention having thus been described, the following is claimed:

1. Apparatus adapted for securing a workpiece having at least two internal holes to a table of a machine tool, comprising a base plate including means defining an array of perpendicular rows of threaded holes and precision bores having parallel axes and forming an X-Y grid pattern, a set of first and second locating pins for the holes within the workpiece, a set of first and second block members supporting said locating pins with parallel spaced axes, means for securing said first block member to said base plate, means on said locating pins for precisely positioning the holes within the workpiece relative to the axes of said locating pins, guide means supporting said second block member and said second locating pin for adjustable linear movement relative to said first block member and said first locating pin, said guide means having precision bores align with said precision bores within said base plate, means for securing said guide means to said base plate, and means for securing said second block member to said base plate after being adjusted according to the spacing of the holes within the workpiece.

2. Apparatus as defined in claim 1 wherein said first locating pin extends through said first block member and into one of said precision bores within said base plate.

3. Apparatus as defined in claim 1 wherein at least one of said locating pins has an upper portion with stepped concentric cylindrical surfaces having different diameters.

4. Apparatus as defined in claim 1 and including means for securing the workpiece to said locating pins.

5. Apparatus as defined in claim 1 wherein said guide means comprise a pair of parallel spaced guide blocks confining said second block member therebetween, and each of said guide blocks includes a pair of said precision bores aligned with a pair of said precision bores within said base plate.

6. Apparatus as defined in claim 1 wherein each of said locating pins includes an outwardly projecting circumferential flange, and a set of screws clamping each of said flanges to the corresponding said block member.

7. Apparatus as defined in claim 1 wherein said second block member is elongated and has precision longitudinal side surfaces, means defining a longitudinally extending slot within said second block member between said side surfaces, and said means for securing said second block member comprise a screw extending through said slot and into one of said threaded holes within said base plate.

8. Apparatus as defined in claim 1 wherein at least one of said locating pins has an upper portion with an axially extending threaded hole, and a C-shaped washer mounted on a screw extending into said threaded hole within said one locating pin for securing the workpiece to said one locating pin.

9. Apparatus for securing a workpiece to the table of a machine tool, comprising a base plate including means defining a precision X-Y grid pattern of threaded holes and precision bores having parallel axes, a body member, a toggle clamp mounted on said body member for releasably gripping the workpiece, said toggle clamp including a bracket secured to said body member, a clamping arm pivotally connected to said bracket, a handle member pivotally connected to said bracket, a link member pivotally connected to both said clamping arm and said handle member, said body member having a bottom surface and defining a cylindrical bore extending upwardly from said surface, a stud member having a cylindrical head portion extending into said bore in closely fitting relation and providing for rotating said body member on said stud member while maintaining axial alignment of said body member and said stud member, said stud member further including a threaded portion projecting downwardly from said head portion for engaging one of said threaded holes within said base plate, means for retaining said head portion of said stud member within said bore of said body member for relative rotation, and means for engaging said head portion of said stud member to rotate said stud member within said bore for tightening said threaded portion into said threaded hole within said base plate.

10. Apparatus as defined in claim 9 wherein said means for engaging said head portion of said stud member comprise means defining a laterally extending hole within said body member for temporarily receiving a locking tool, and means on said head member for receiving said tool and for preventing rotation of said body member relative to said stud member.

11. Apparatus as defined in claim 10 wherein said means on said head portion comprise a diametrically extending hole within said head portion, and said hole within said head portion is disposed for alignment with said hole within said body member for receiving a pin-like said locking tool.

12. Apparatus for securing a workpiece to a table of a machine tool, comprising a base plate including means defining a precision X-Y grid pattern of threaded holes and precision bores having parallel axes, a set of separate slot defining plates each including means defining a set of precision bores having parallel axes, each of said slot defining plates having a set of peripheral edge surfaces each defining an undercut recess, said precision bores within each of said slot defining plates being located in precise axial alignment with corresponding said precision bores within said base plate when said slot defining plate is properly positioned on said base plate, a set of precision locating pins extending within the axially aligned said precision bores within said base plate and each of said slot defining plates, means for releasably securing each of said slot defining plates directly to said base plate, and said undercut recess defined by at least one of said edge surfaces of each slot defining plate cooperating with said undercut recess defined by at least one of said edge surfaces of an adjacent said slot defining plate to define an undercut slot when said slot defining plates are secured to said base plate.

13. Apparatus as defined in claim 12 wherein at least one of said slot defining plates is triangular.

14. Apparatus as defined in claim 12 wherein at least one of said slot defining plates has four square corners.

15. Apparatus as defined in claim 12 wherein said one edge surface of each of said slot defining plates forms a precision dimension with each of said precision bores within said slot defining plate.

16. Apparatus adapted for precisely locating and securing a workpiece having at least two internal holes to a table of a machine tool, comprising a base plate including means defining an array of perpendicular rows of threaded holes and precision bores having parallel axes and forming an X-Y grid pattern, a set of first and second locating pins corresponding to the holes within the workpiece, each of said pins having a precision cylindrical upper portion, a set of blocks mounted on said base plate and supporting said locating pins with parallel spaced axes aligned with the axes of the holes within the workpiece and with said cylindrical upper portions of said pins being precisely concentric with the holes within the workpiece, some of said blocks having a set of precision bores aligned with said precision bores within said base plate, means for securing said blocks to said base plate and providing for moving and adjusting one of said locating pins and the supporting said block laterally on said base plate to accommodate workpiece holes having different spacing, and a set of precision locating pins extending into said aligned precision bores within said blocks and said base plate.

* * * * *